M. E. HOLMES.
ELECTRIC BATTERY DEPOLARIZER.
APPLICATION FILED JAN. 7, 1916.
1,272,952.
Patented July 16, 1918.
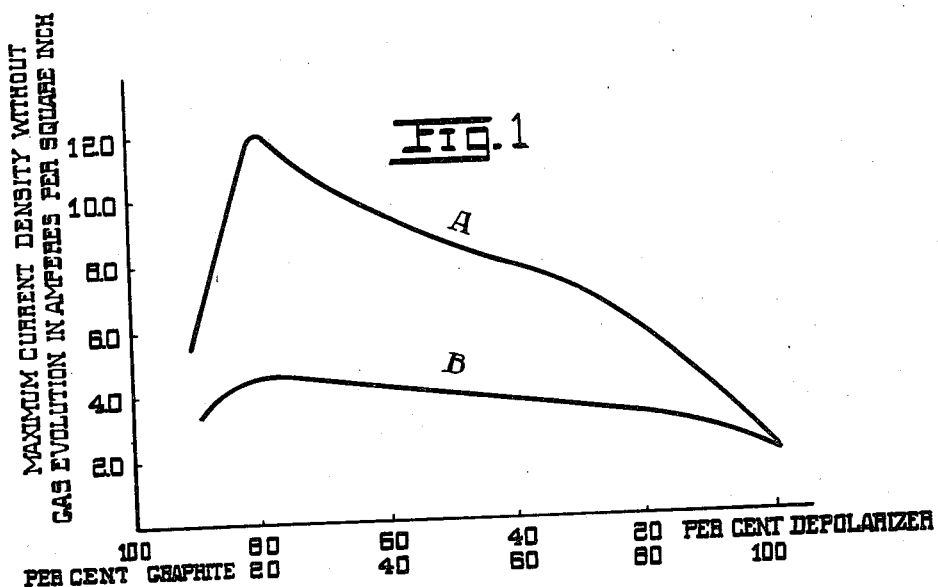
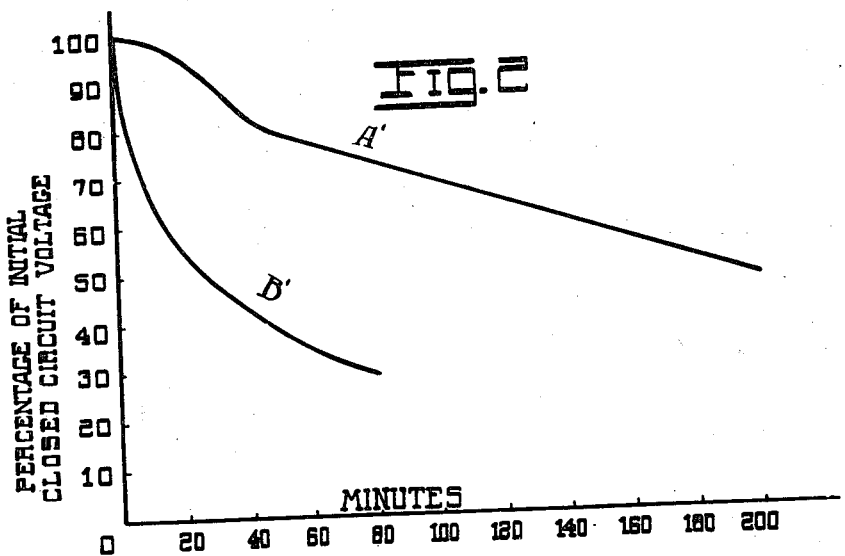
INVENTOR.
M. E. HOLMES
BY
ATTORNEY

UNITED STATES PATENT OFFICE.

MAJOR E. HOLMES, OF LAKEWOOD, OHIO, ASSIGNOR, BY MESNE ASSIGNMENTS, TO NATIONAL CARBON COMPANY, INC., A CORPORATION OF NEW YORK.

ELECTRIC-BATTERY DEPOLARIZER.

1,272,952.   Specification of Letters Patent.   Patented July 16, 1918.

Application filed January 7, 1916. Serial No. 70,768.

*To all whom it may concern:*

Be it known that I, MAJOR E. HOLMES, a citizen of the United States, residing at Lakewood, in the county of Cuyahoga and State of Ohio, have invented a certain new and useful Improvement in Electric-Battery Depolarizers, of which the following is a full, clear, and exact description.

My invention relates to depolarizers which are generally required for the efficient working of electric batteries.

The use of depolarizers in electric batteries was one of the early developments in the battery art, but comparatively few substances have been found to possess sufficient depolarizing properties to be commercially successful. In fact, the oxids of manganese and copper are the only ones used to any extent in commercial primary batteries. The object of my invention is to procure new materials that have marked advantages over present depolarizers, as will be pointed out in the appended description with reference to the drawings in which:

Figure 1 graphically illustrates the behavior of mixtures of graphite and depolarizer toward nascent hydrogen.

Fig. 2 shows curves of per cent. voltage drop during service.

Oxids in order to be suitable for depolarizers in electric cells of the modern dry cell type, must possess certain chemical and physical properties. They must be insoluble, or nearly so, in the electrolyte solution in order to avoid deterioration in depolarizing capacity and to prevent interaction with the zinc electrode. They should have a high percentage of available oxygen. They should preferably be acid anhydrids since basic oxids tend to decompose ammonium salts which are the usual electrolytes in cells of the type referred to. They should, when mixed with graphite, have the capacity of absorbing a large volume of electrolytic solution. They should have those properties which would permit of their being molded with graphite into a dense mass to effect good contact between the depolarizer and conducting material. I have found that molybednum trioxid possesses the above properties in a very satisfactory degree.

There is still another property which is difficult to definitely predict from a knowledge of specific chemical and physical properties of the material, and which is of supreme importance in determining the worth of such substance as a depolarizer. I refer to the reactivity of mixtures of the depolarizer and graphite toward nascent hydrogen. In performing this primary function of a depolarizer, I have found that molybdenum trioxid greatly exceeds the capacity of the ordinary depolarizers. With this, and other depolarizers, I have determined, 1st the maximum current density at which hydrogen ions may be discharged against the surface of the mixture of the depolarizer and graphite without gas evolution, and 2nd, the length of time that the hydrogen ions can be discharged at a rate comparable with that in ordinary service conditions, without gas evolution.

I have graphically shown in Fig. 1 of the drawings the results in the first determination where the ordinates represent current density and the abscissas mixtures of graphite and depolarizer. In this figure curve A gives the results with molybdenum trioxid and curve B that of pyrolusite. A comparison of the two curves shows at once the superiority of molybdenum trioxid.

In the second determination above mentioned, with a current density of twenty-one hundredths amperes per square inch cross section, molybdenum trioxid shows an advantage of about 1000% over pyrolusite. That is, hydrogen gas will commence to evolve with pyrolusite in about one tenth the time that it does with molybdenum trioxid.

When depolarizers are used in cells of the so-called dry cell type, it is necessary to mix some conducting body with them, such as graphite or other form of carbon. The proportion in which these two substances are mixed has considerable influence on the various factors of the dry cell, and therefore I have made tests to determine the best proportion to be used, all things considered. The following table gives the various characteristics of the depolarizer of varying amounts of pyrolusite and molybdenum trioxid, when mixed with graphite, using an electrolyte consisting of 100 parts water, 18 parts zinc chlorid and 33 parts ammonium chlorid:—

The drop in voltage of a cell in which a depolarizer is used is very instructive in re-

| Lot. | Depolarizer. | Mix ratio. | | Volts. | Initial current. | Service through 2¾ ohms to— | | Initial closed circuit voltage. |
|---|---|---|---|---|---|---|---|---|
| | | Depol. | Graph. | | | .5 V. | .3 V. | |
| 1 | C. pyrolusite | 90 | 10 | 1.62 | .7 | 32 min | 78 min | 1.06 |
| 2 | ...do... | 80 | 20 | 1.59 | 1.4 | 27 min | 64 min | 1.04 |
| 3 | ...do... | 70 | 30 | 1.57 | 1.9 | 22 min | 42 min | 1.04 |
| 4 | ...do... | 60 | 40 | 1.58 | 1.8 | 21 min | 40 min | 1.02 |
| 5 | Molybdenum trioxid | 90 | 10 | 1.18 | .4 | 0 min | 216 min | .4 |
| 6 | ...do... | 80 | 20 | 1.26 | .6 | 65 min | 212 min | .66 |
| 7 | ...do... | 70 | 30 | 1.30 | 1.9 | 55 min | 180 min | .74 |
| 8 | ...do... | 60 | 40 | 1.25 | 1.5 | 52 min | 156 min | .70 |
| 9 | None (mix consisting wholly of graphite) | | | 1.38 | .5 | 9 sec | 37 sec | .8 | gard to the worth of the depolarizer and I therefore have given in Fig. 2 curves to illustrate the per cent. drop in voltage. In this figure are plotted the percentages of drop in voltage of the two depolarizers on 2¾ ohms continuous service test, curves B' and A' relating to pyrolusite and molybdenum trioxid respectively. That is, electric cells are made up with the depolarizers, their circuits closed through the resistance of 2¾ ohms, and the curve plotted from data obtained in such test. In the figure the ordinates represent the percentage drop in voltage, while the abscissas represent the service life in minutes. It will be evident from an inspection of the data given in the preceding table, that the best ratio of pyrolusite to graphite is 90 to 10, and of molybdenum trioxid to graphite is 80 to 20. The cell from which the percentage drop was calculated in the two cases was therefore constructed with this ratio of materials.

An inspection of the data in the table also shows that the initial voltage of molybdenum trioxid is less than that of pyrolusite; but since the percentage drop of voltage on rigorous service, such as in miniature or flashlight work, is very much less for molybdenum trioxid than for pyrolusite, this more than offsets the disadvantage of low voltage, since all that is necessary is to use a lower voltage lamp with flashlight cells containing the molybdenum trioxid as depolarizer. When this change is made a much greater service life will be obtained than with pyrolusite.

The molybdenum trioxid, or molybdic acid anhydrid referred to above is a yellow crystalline powder when obtained by crystallization from the melt. Before using this material in dry cells, such would preferably be crushed into powdered form and mixed with graphite or other form of carbon to furnish the proper conductivity. The mixture of oxid and graphite, moistened with electrolyte, would then be tamped around the carbon electrode of a dry cell, for instance inside a zinc, or other electrode container, with a bibulous lining separating it from the latter. In the so-called Leclanché type of dry cell, which is the one most generally used, the electrolyte referred to would be chlorids of ammonium and zinc, though other electrolytes may be used.

I have also found that certain oxid salts and complex compounds of molybdenum have advantageous properties when used as depolarizers. For instance, molybdates of sodium and lead can be used as depolarizers. There are many other salts of this nature capable of use, as molybdenum trioxid has a tendency to form molybdates and polymolybdates in large number, so that I propose to use molybdates having the general formula $xMO \cdot yMoO_3$, where $y$ is equal to or greater than $x$. In this formula $x$ and $y$ represent numerical coefficients and M a metal.

As an illustration of a complex molybdate, I may mention ammonium-phosphomolybdate $(NH_4)_3PO_4 \cdot 12MoO_3$. This has proven to be very satisfactory as a depolarizer and is less reducible by zinc in $NH_3$ solution than $MoO_3$.

Molybdenum trioxid is capable of hydration in accordance with the formula $MoO_3 \cdot xH_2O$, and such hydrates are within the purvey of my invention. While there would be great advantage in using molybdenum depolarizers altogether in dry cells, the question of expense may make it advisable to mix these with pyrolusite or other cheaper depolarizer to obtain the best commercial cell, everything considered.

Having described my invention, what I claim is:—

1. In primary batteries, a depolarizer containing molybdenum trioxid.

2. In primary batteries, positive and negative electrodes and a depolarizing mix consisting of substantially 80 parts molybdic trioxid and 20 parts graphite.

In testimony whereof, I hereunto affix my signature.

MAJOR E. HOLMES.